G. PARKER.
BRAKE FOR SIDE CAR MOTOR CYCLES.
APPLICATION FILED JULY 26, 1921.
1,431,029.
Patented Oct. 3, 1922.
2 SHEETS—SHEET 1.
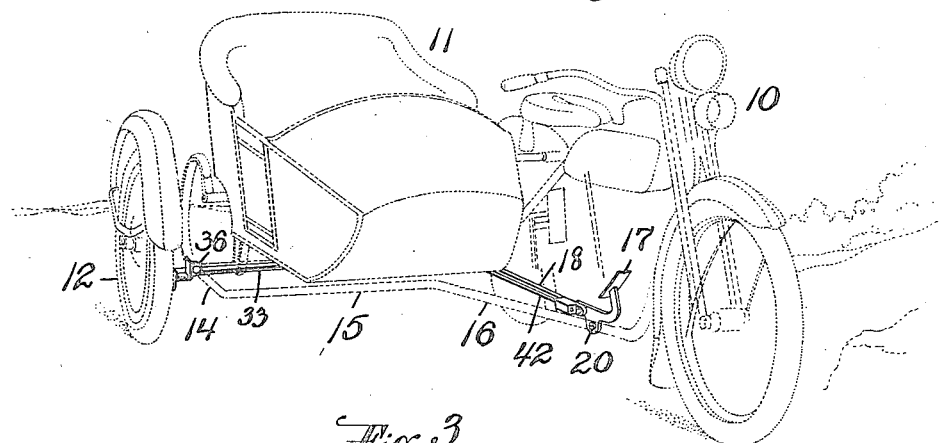
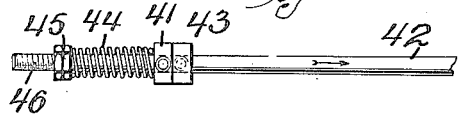
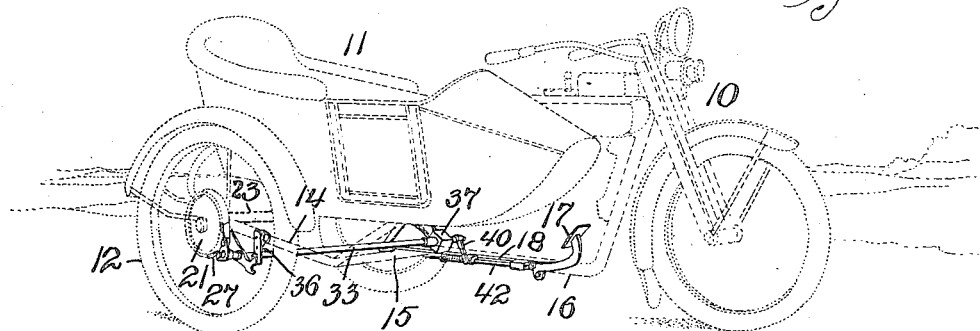
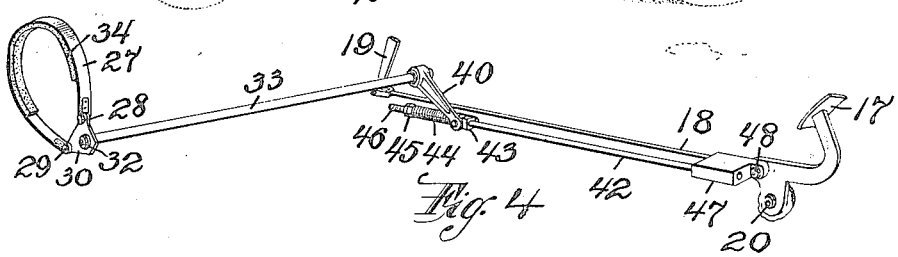
INVENTOR
Grover Parker,
BY
Wm. H. Caufield
ATTORNEY.

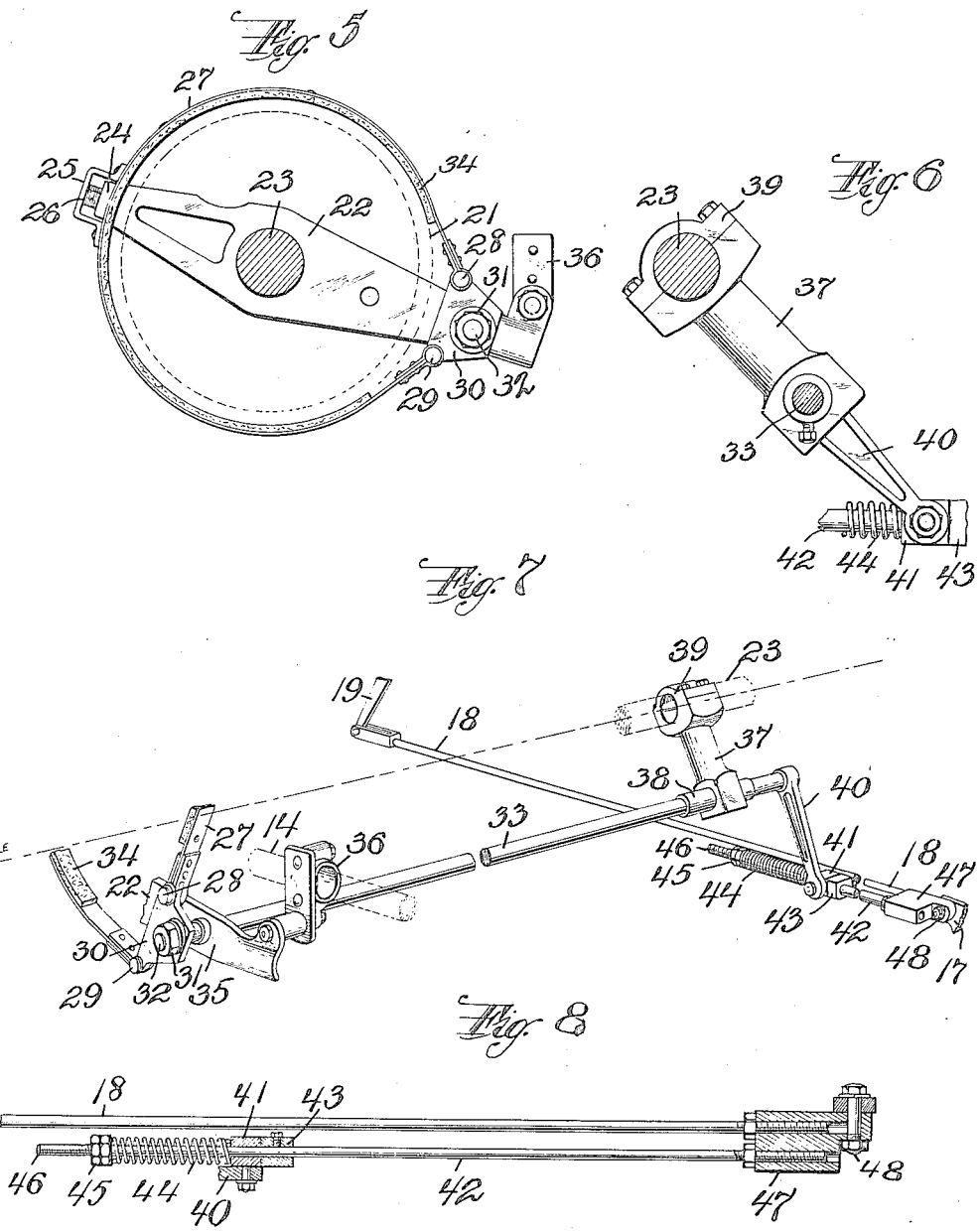

Patented Oct. 3, 1922.

1,431,029

UNITED STATES PATENT OFFICE.

GROVER PARKER, OF EATONTOWN, NEW JERSEY.

BRAKE FOR SIDE-CAR MOTOR CYCLES.

Application filed July 26, 1921. Serial No. 487,665.

*To all whom it may concern:*

Be it known that I, GROVER PARKER, a citizen of the United States, and a resident of Eatontown, county of Monmouth, and State of New Jersey, have invented certain new and useful Improvements in Brakes for Side-Car Motor Cycles, of which the following is a specification.

This invention relates to an improved brake for a motorcycle with a side car which is adapted to apply a brake to the wheel of the side car at the same time that the main brake of the motorcycle is applied, and to thus provide against the swaying or turning of such a vehicle, which is at present the case when the side car is not so equipped.

The invention also relates to a brake of this kind in which, after the required pressure has been applied to the side car brake, the main brake of the motorcycle itself can be still further applied, such further application being usually necessary on account of the increased weight of the motorcycle itself and the necessity of more powerful pressure being applied to the main brake.

The invention further consists in certain details of construction to be hereinafter more fully described and finally embodied in the claims.

The invention is illustrated in the accompanying drawings, in which Figure 1 is a perspective view of a motorcycle, shown in dotted outline, and the braking attachment being shown in full lines. Figure 2 is a similar view with the vehicle turned more to the side to more clearly show the arrangement of the different parts. Figure 3 is a detail view of one form of adjustment of the stem of the side car braking device. Figure 4 is a perspective view of the braking attachment detached from the car. Figure 5 is a detail side view of the brake, the brake band and associated mechanism for tightening the brake band on the side car. Figure 6 is a detail view of one of the brackets, showing part of the brake lever of the side car brake, and Figure 7 is a perspective view showing the side car braking attachment, a portion thereof being broken away, Figure 8 is a detail section showing an equalizing device used in conjunction with the main brake rod and the brake stem of the side car brake.

10 indicates the motorcycle itself, which is equipped with the side car 11, these side cars being provided with a wheel 12 on the outer side, which wheel rotates on the end of an axle 23, and the frame 14 extends forward from the outer end of the axle and then laterally across and underneath the side car body, as at 15, and is connected with the lower bar 16 of the main motorcycle frame.

The motorcycle, is equipped with a foot lever 17 which, when pressed by the foot, actuates the brake rod 18, which pulls the brake lever 19 of the main brake of the motorcycle, the brake not being shown in detail because these parts are in common use and form in themselves no part of this invention. The foot lever 17 is usually hinged, as at 20, so that considerable leverage is provided for the foot and the operation of the brake is not difficult.

The brake for the side car wheel is preferably a band brake and consists of a brake drum 21 which is fastened by any suitable means to the wheel, and adjacent to which is an arm 22 which has an opening intermediate of its ends through which the axle 23 of the side car passes. The arm 22 is bent over at its end, as at 24, and the saddle 25 straddles this end 24 and is normally pressed outward by the spring 26 so as to normally hold the brake band 27 in its released position. The brake band 27 is usually made of thin steel and is flexible and is secured at its two ends 28 and 29 to a lever 30 which functions as a bell crank, being pivoted, this pivotal connection in the form shown comprising a nut 31 which fits on the end 32 of the rod 33. Inside the brake band is the usual brake lining 34 which bears on the periphery of the brake drum when the brake is applied, so as to retard the rotation of the drum and consequently of the wheel to which the drum is attached.

The rod 33 is substantially parallel with the axle and passes at one end through a bearing formed in the extension 35 of the arm 22, which extension 35 is fastened to a suitable bracket 36 which is adapted to be clamped over the side bar 14 of the motorcycle frame, the parts thus cooperating to stabilize this structure, since the arm is supported on the fixed elements, that is, the axle of the side car and the bracket 36, and, in turn, acts to support one end of the rod 33, the other end of the rod 33 being supported in a bracket 37 which has at its lower end a bearing 38 for the rod 33, and at its top end 39 is constructed so that it can be clamped over the axle 23 and thus be rigidly held in place.

The rod 33 is adapted to be oscillated by the lever 40, the lower end of which is pivoted to a block 41 which is arranged loosely, the stem 42 bearing at one end against the adjustable collar 43, and on the side of the block opposite the collar is a spring 44 which encircles the stem and is adapted to be compressed to the desired extent by the nut 45 screwing on the screw-threaded end 46 of the stem 42. The stem 42 is suitably secured, such as by screwing it into the clip 47, and the main brake rod 18 of the motorcycle is also secured to this clip 47, the clip 47 being secured, as by the bolt 48, to the rear end of the foot lever 17.

Motorcycles without this side car brake, when they are stopped suddenly by the application of the brake of the motorcycle proper, have a tendency to swing, due to the weight of the motorcycle side car, especially when it contains a passenger or two, which is dangerous since it often has enough swing to throw the vehicle in the path of others and also cause an increased wear on the tires, due to the consequent skidding of the wheels.

With the present device the brakes are applied simultaneously, that is, the main brake of the motorcycle as now used and also this auxiliary brake on the wheel of the side car, and when the brakes are applied by means of the foot lever 17 the clip 47 pulls on the stem 42 and the brake rod 18, the stem 42 pushing, by means of the spring 44, against the lever 40, which pulls the rod 33 and applies the brake band 27, and when the brake band is tight on the wheel the main brake of the motorcycle can be still further applied, since lost motion is provided through the spring 44, because the stem 42 can slide through the block 41 and the brake rod 18 can be given all the excess movement necessary to tightly set the heavier and main brake on the motorcycle proper, which, carrying the most weight, requires more powerful braking.

It will be understood that minor changes can be made in the arrangements of the parts and details of construction without departing from the scope of the invention.

I claim:

1. The combination of a motorcycle and a side car and a brake for said motorcycle, with a brake adapted to retard the movement of the wheel of said side car, and a connection whereby the said side car brake is operated when the main brake is operated.

2. The combination of a motorcycle and a side car and a brake for said motorcycle, with a brake adapted to retard the movement of the wheel of said side car, and a yielding connection for actuating both brakes simultaneously, said connection permitting continued movement of the main brake after the side car brake is on.

3. A brake comprising a transverse rod, brackets for securing said rod to a motorcycle side car, a band brake adapted for attachment to the wheel of the side car, and detachable means for connecting the rod to the brake of a motorcycle.

4. A brake comprising brackets for securing the device to the side car of a motorcycle, a rod supported by said brackets, a drum adapted to be attached to the wheel of the side car, an arm adapted to rock at its center on the axle of the side car, a brake band supported by said arm and adapted to surround the drum, a bell crank with its ends connected to the brake band, said crank being secured to the rod, a lever secured to the rod, and means for connecting the lever with the main brake of the motorcycle.

5. A brake comprising brackets for securing the device to the side car of a motorcycle, a rod supported by said brackets, a drum adapted to be attached to the wheel of the side car, an arm adapted to rock at its center on the axle of the side car, a brake band supported by said arm and adapted to surround the drum, a bell crank with its ends connected to the brake band, said crank being secured to the rod, a lever secured to the rod, a stem adapted to be secured to the main brake of the motorcycle, a block pivotally connected to the end of the lever, through which block the stem freely slides, a collar for limiting the movement of the block in one direction on the stem, a spring encircling the stem on the side of the block opposite the collar, the spring being disposed so that one end bears on the lever, and a nut screwing on the stem and bearing against the other end of the spring.

6. The combination of a motorcycle, a side car and a brake for said motorcycle, said brake including a brake lever with a brake disposed so as to retard the movement of the wheel of the side car, said side car brake including a lever, a clip connected to the brake lever, a main brake rod connecting the clip and the main brake of the motorcycle, a stem connected to the clip, a block slidable on the stem, a collar to engage the block, a spring surrounding the stem and bearing on the side of the block opposite to the one engaged by the collar, and means on the stem for adjusting the compression of the spring.

In testimony that I claim the foregoing, I have hereto set my hand, this 23rd day of July, 1921.

GROVER PARKER.